(12) United States Patent
Kaita

(10) Patent No.: US 12,247,091 B2
(45) Date of Patent: Mar. 11, 2025

(54) LAMINATE AND PRODUCT

(71) Applicant: BRIDGESTONE CORPORATION, Tokyo (JP)

(72) Inventor: Shojiro Kaita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 203 days.

(21) Appl. No.: 17/997,643

(22) PCT Filed: Apr. 28, 2021

(86) PCT No.: PCT/JP2021/016973
§ 371 (c)(1),
(2) Date: Oct. 31, 2022

(87) PCT Pub. No.: WO2021/221103
PCT Pub. Date: Nov. 4, 2021

(65) Prior Publication Data
US 2023/0265226 A1   Aug. 24, 2023

(30) Foreign Application Priority Data
May 1, 2020 (JP) .................................. 2020-081249

(51) Int. Cl.
*C08F 210/02* (2006.01)
*B32B 27/08* (2006.01)
(Continued)

(52) U.S. Cl.
CPC ............ *C08F 210/02* (2013.01); *B32B 27/08* (2013.01); *B32B 27/302* (2013.01); *B32B 27/32* (2013.01);
(Continued)

(58) Field of Classification Search
None
See application file for complete search history.

(56) References Cited

U.S. PATENT DOCUMENTS 2,999,083 A     9/1961  Killey et al.
5,474,645 A *  12/1995  Bohm .................... B29D 30/08
                                                           156/394.1
(Continued)

FOREIGN PATENT DOCUMENTS

EP    4 067 074 A1    10/2022
JP    2002-173562 A    6/2002
(Continued)

OTHER PUBLICATIONS

Machine translation of JP 2012-179808 A (Year: 2012).*
(Continued)

*Primary Examiner* — Ramsey Zacharia
(74) *Attorney, Agent, or Firm* — Sughrue Mion, PLLC

(57) ABSTRACT

A laminated body 10 includes: a layer (C) 12 consisting of a composition (c) containing a copolymer that contains a conjugated diene unit and a non-conjugated olefin unit and contains 0 mol % of a butylene unit; and a layer (R) 14 consisting of a composition (r) containing an olefin-based resin, in which the layer (C) 12 is adjacent to the layer (R) 14. The laminated body 10 is excellent in a mechanical strength and impact resistance, and is easy to repair.

13 Claims, 1 Drawing Sheet

(51) Int. Cl.
  *B32B 27/30* (2006.01)
  *B32B 27/32* (2006.01)
  *B65D 65/40* (2006.01)

(52) U.S. Cl.
  CPC ....... *B32B 2270/00* (2013.01); *B32B 2307/54* (2013.01); *B32B 2307/558* (2013.01); *B32B 2307/704* (2013.01); *B32B 2307/748* (2013.01); *B65D 65/40* (2013.01); *B65D 2565/385* (2013.01)

(56) References Cited

U.S. PATENT DOCUMENTS

2018/0282459 A1   10/2018   Kimura et al.
2019/0367654 A1   12/2019   Horikawa et al.

FOREIGN PATENT DOCUMENTS

| JP | 2012-179807 A  | 9/2012  |
| JP | 2012-179808 A  | 9/2012  |
| JP | 2012-180458 A  | 9/2012  |
| JP | 2019-166810 A  | 10/2019 |
| WO | 2017/064859 A1 | 4/2017  |
| WO | 2017/065300 A1 | 4/2017  |
| WO | 2018/092733 A1 | 5/2018  |
| WO | 2021/205824 A1 | 10/2021 |

OTHER PUBLICATIONS

Extended European Search Report dated Sep. 28, 2023 in European Application No. 21796557.3.
International Search Report for PCT/JP2021/016973 dated Jul. 27, 2021.

* cited by examiner

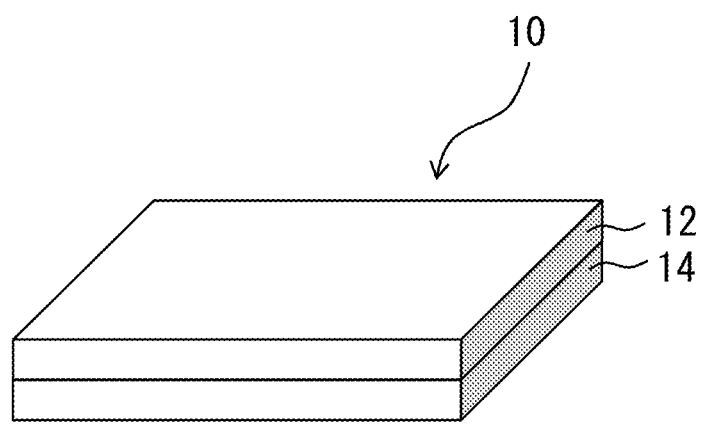

LAMINATE AND PRODUCT

CROSS REFERENCE TO RELATED APPLICATIONS

This application is a National Stage of International Application No. PCT/JP2021/016973 filed Apr. 28, 2021, claiming priority based on Japanese Patent Application No. 2020-081249 filed May 1, 2020.

TECHNICAL FIELD

The present invention relates to a laminated body and a product.

BACKGROUND ART

Since polyethylene is inexpensive and mass-produced, polyethylene is used for various applications such as packaging materials, containers, and industrial parts.

For example, it is disclosed that, from a viewpoint of imparting high recyclability, printability, and a strength to a packaging material, a polyethylene laminated body for a packaging material is a laminated body including at least a stretched polyethylene film and a heat-sealable polyethylene layer, in which an image is formed on at least one surface of the stretched polyethylene film (for example, see PTL 1).

CITATION LIST

Patent Literature

PTL 1: JP 2019-166810 A

SUMMARY OF INVENTION

Technical Problem

However, although a related-art laminated body consisting of polyethylene, represented by PTL 1, is excellent in electrical insulation and water resistance, there is room for improving a strength and impact resistance, and a portion that once cracks is difficult to repair, and therefore an improvement is required.

An object of the present invention is to provide a laminated body and a product excellent in a mechanical strength and impact resistance and easy to repair, and the present invention addresses a problem of achieving the object.

Solution to Problem

<1> A laminated body including:
a layer (C) consisting of a composition (c) containing a copolymer that contains a conjugated diene unit and a non-conjugated olefin unit and contains 0 mol % of a butylene unit; and
a layer (R) consisting of a composition (r) containing an olefin-based resin,
wherein the layer (C) is adjacent to the layer (R).
<2> The laminated body according to <1>, wherein the olefin-based resin contains a non-conjugated olefin unit.
<3> The laminated body according to <1> or <2>, wherein the olefin-based resin contains an olefin unit having 2 to 5 carbon atoms.
<4> The laminated body according to <2> or <3>, wherein a difference between the number of carbon atoms in the non-conjugated olefin unit contained in the copolymer and the number of carbon atoms in the non-conjugated olefin unit contained in the olefin-based resin is 2 or less.
<5> The laminated body according to any one of <1> to <4>, wherein in the copolymer, a content of the conjugated diene unit is more than 0 mol % and 50 mol % or less, and a content of the non-conjugated olefin unit is 50 mol % or more and less than 100 mol %.
<6> The laminated body according to any one of <1> to <4>, wherein the copolymer further contains an aromatic vinyl unit.
<7> The laminated body according to <6>, wherein in the copolymer, a content of the conjugated diene unit is 1 to 50 mol %, a content of the non-conjugated olefin unit is 40 to 97 mol %, and a content of the aromatic vinyl unit is 2 to 35 mol %.
<8> The laminated body according to any one of <1> to <7>, wherein in the copolymer, a melting point measured by a differential scanning calorimeter is 30 to 130° C.
<9> The laminated body according to any one of <1> to <8>, wherein a degree of crystallinity of the copolymer is 0.5 to 50%.
<10> The laminated body according to any one of <1> to <9>, wherein a weight-average molecular weight of the copolymer as expressed in terms of polystyrene is 10,000 to 9,000,000.
<11> The laminated body according to any one of <1> to <10>, wherein in the copolymer, the non-conjugated olefin unit is an acyclic non-conjugated olefin unit.
<12> The laminated body according to <11>, wherein in the copolymer, the acyclic non-conjugated olefin unit is consisting of only an ethylene unit.
<13> The laminated body according to any one of <6> to <12>, wherein in the copolymer, the aromatic vinyl unit contains a styrene unit.
<14> The laminated body according to any one of <1> to <13>, wherein in the copolymer, the conjugated diene unit contains at least one selected from a group consisting of a 1,3-butadiene unit and an isoprene unit.
<15> The laminated body according to any one of <1> to <14>, wherein in the copolymer, a main chain only has an acyclic structure.
<16> A product using the laminated body according to any one of <1> to <15>.

Advantageous Effects of Invention

According to the present invention, it is possible to provide a laminated body and a product excellent in a mechanical strength and impact resistance and easy to repair.

BRIEF DESCRIPTION OF DRAWINGS

FIG. 1 is a schematic perspective view of a laminated body according to an embodiment of the present invention.

DESCRIPTION OF EMBODIMENTS

<Laminated Body>
A laminated body of the present invention includes:
a layer (C) consisting of a composition (c) containing a copolymer that contains a conjugated diene unit and a non-conjugated olefin unit and contains 0 mol % of a butylene unit; and
a layer (R) consisting of a composition (r) containing an olefin-based resin,
in which the layer (C) is adjacent to the layer (R).

Hereinafter, a copolymer containing a conjugated diene unit and a non-conjugated olefin unit is referred to as a "copolymer of the present invention".

A laminated body consisting of polyethylene is excellent in electrical insulation and water resistance, but there is room for improvement in strength and impact resistance, and it is difficult to repair a portion that once cracks.

In contrast, the laminated body of the present invention includes the layer (R) consisting of the composition (r) containing the olefin-based resin, but is excellent in mechanical strength and impact resistance because of presence of the adjacent layer (C) consisting of the composition (c) containing the copolymer of the present invention.

Further, the copolymer of the present invention contains the non-conjugated olefin unit and has high affinity with the olefin-based resin, so that the layer (R) and the layer (C) are easily integrated by close contact therebetween and can be easily integrated by being subjected to thermocompression bonding. Therefore, there is little risk of peeling between layers, which can further contribute to the mechanical strength and the impact resistance.

Furthermore, the copolymer of the present invention can be softened at a temperature as high as that of hot water, and the copolymers of the present invention are easily adhered to and integrated with each other. Therefore, even when irregularities are generated on a surface of the laminated body due to damage such as cracks in the laminated body (particularly, on a surface on a layer (C) side), the damaged surface can be directly heated at 90 to 160° C., or a sheet newly consisting of the layer (C) is brought into contact with the damaged surface, followed by heating at 90 to 160° C., whereby a smooth surface can be restored and repair is easy.

Hereinafter, the laminated body of the present invention, the copolymer of the present invention, and the olefin-based resin will be described in detail.

[Laminated Structure]

FIG. 1 shows a schematic perspective view of the laminated body according to an embodiment of the present invention.

A laminated body 10 shown in FIG. 1 has a two-type two-layer structure including a rectangular single-layer layer (C) 12 and a rectangular single-layer layer (R) 14, in which the layer (C) 12 is adjacent to the layer (R) 14.

The laminated body of the present invention is not limited to the structure shown in FIG. 1, and for example, each of the layer (C) 12 and the layer (R) 14 may be independently made of two or more layers.

Further, the layer (C) 12 may include the same layer as the layer (R) 14 or another functional layer on a surface on a side opposite to a surface adjacent to the layer (R) 14, in other words, on a surface of the laminated body 10 where the layer (C) 12 is exposed. Similarly, the layer (R) 14 may include the same layer as the layer (C) 12 or another functional layer on a surface on a side opposite to a surface adjacent to the layer (C) 12, in other words, on a surface of the laminated body 10 where the layer (R) 14 is exposed.

Hereinafter, a description will be made with reference numerals in drawings omitted.

Examples of the functional layer include an ultraviolet absorbing layer containing an ultraviolet absorber, a reflective layer containing white particles or the like, and an adhesive layer containing an adhesive.

Instead of separately providing the functional layer, the layer (C) and the layer (R) themselves may be made functional by containing a functional component in the composition (c) constituting the layer (C), the composition (r) constituting the layer (R), or both the compositions. The functional component that may be contained in each composition will be described later.

An adhesive may be provided between layers such as between two or more layers (R), between the layer (C) and the functional layer when the functional layer is provided on the layer (C), between the layer (R) and the functional layer when the functional layer is provided on the layer (R), or between the functional layers when two or more functional layers are laminated, in order to enhance adhesiveness and adhesion between the layers.

Since the layers (C) have excellent adhesiveness, even when two or more layers (C) are laminated, an adhesive may not be present between the layers.

From a viewpoint of flexibility of the laminated body, the laminated body preferably does not have an adhesive.

Regarding the layer (C), a layer thickness of one layer is preferably 0.01 to 10 mm, more preferably 0.1 to 7 mm, and still more preferably 0.5 to 5 mm from a viewpoint of improving the mechanical strength and the impact resistance.

When the laminated body includes two or more layers (C), a total layer thickness of the layer (C) is preferably 0.1 to 20 mm, more preferably 0.5 to 10 mm, and still more preferably 0.5 to 5 mm from the viewpoint of improving the mechanical strength and the impact resistance.

Regarding the layer (R), a layer thickness of one layer is preferably 0.01 to 10 mm, more preferably 0.1 to 7 mm, and still more preferably 0.5 to 5 mm from a viewpoint of the electrical insulation, the water resistance, and the like.

When the laminated body includes two or more layers (R), a total layer thickness of the layer (R) is preferably 0.1 to 20 mm, more preferably 0.5 to 10 mm, and still more preferably 0.5 to 5 mm from the viewpoint of the electrical insulation, the water resistance, and the like.

In the laminated body, a thickness ratio of the layer (C) to the layer (R) [the total layer thickness of the layer (C)/the total layer thickness of the layer (R)] is preferably $1/9$ to $9/1$, more preferably $2/8$ to $8/2$, and still more preferably $3/7$ to $7/3$ from the viewpoint of improving the mechanical strength and the impact resistance.

From the viewpoint of improving the mechanical strength and the impact resistance, a layer thickness of the laminated body is preferably 0.02 to 30 mm, more preferably 0.2 to 20 mm, and still more preferably 1 to 10 mm.

[Composition (c)]

The layer (C) is consisting of the composition (c) containing the copolymer (the copolymer of the present invention) that contains the conjugated diene unit and the non-conjugated olefin unit and contains 0 mol % of the butylene unit.

The composition (c) may contain various functional components and the like in addition to the copolymer of the present invention.

[Copolymer of Present Invention]

The copolymer of the present invention contains the conjugated diene unit and the non-conjugated olefin unit, and contains 0 mol % of the butylene unit.

The copolymer of the present invention may be a binary copolymer consisting of two types of units that include the conjugated diene unit and the non-conjugated olefin unit, may further be a ternary copolymer consisting of three types of units that include an aromatic vinyl unit, or may further be a multi-component copolymer containing a monomer unit other than the butylene unit.

For example, as a hydrogenated styrene-butadiene-styrene copolymer elastomer used in JP 2012-246366 A, a hydrogenated styrene-ethylene-butylene-styrene copolymer (SEBS) containing a butylene unit is used. In the copolymer of the present invention, the content of the butylene unit is 0 mol %, and the SEBS is not contained in the copolymer of the present invention.

(Conjugated Diene Unit)

The conjugated diene unit is a structural unit derived from a conjugated diene compound serving as a monomer.

Here, the conjugated diene compound refers to a diene compound of a conjugated system. The conjugated diene compound preferably has 4 to 8 carbon atoms. Specifically, examples of such a conjugated diene compound include 1,3-butadiene, isoprene, 1,3-pentadiene, and 2,3-dimethyl-1,3-butadiene. The conjugated diene compound may be used either alone or in combination of two or more thereof.

The conjugated diene compound serving as a monomer of the copolymer of the present invention preferably includes at least one selected from a group consisting of 1, 3-butadiene and isoprene, is more preferably consisting of only at least one selected from a group consisting of 1, 3-butadiene and isoprene, and is still more preferably consisting of only 1, 3-butadiene from the viewpoint of improving the mechanical strength and the impact resistance of the laminated body.

In other words, the conjugated diene unit in the copolymer of the present invention preferably includes at least one selected from the group consisting of a 1, 3-butadiene unit and an isoprene unit, is more preferably consisting of only of at least one selected from the group consisting of the 1, 3-butadiene unit and the isoprene unit, and is still more preferably consisting of a 1, 3-butadiene unit alone.

When the copolymer of the present invention is the binary copolymer, a content of the conjugated diene unit is preferably more than 0 mol % and 50 mol % or less. In this case, a copolymer excellent in elongation and weather resistance can be obtained. From a similar viewpoint, a proportion of the conjugated diene unit in the binary copolymer is more preferably 40 mol % or less.

In the binary copolymer, a proportion of 1,2 adduct (including 3,4 adduct) of the conjugated diene unit is preferably 10% or less. When the proportion is 10% or less, heat resistance and bending fatigue resistance of the copolymer of the present invention can be further improved. From a similar viewpoint, a proportion of the 1,2 adduct (including the 3,4 adduct) of the conjugated diene unit in the binary copolymer is more preferably 8% or less, and still more preferably 6% or less. The proportion of the 1,2 adduct (including the 3,4 adduct) of the conjugated diene unit is a proportion in the entire conjugated diene unit, and is not a proportion in the entire copolymer of the present invention. Further, when the conjugated diene unit is a butadiene unit, the proportion has the same meaning as that of a 1,2-vinyl bond content.

When the copolymer of the present invention is the ternary copolymer or the multi-component copolymer, the content of the conjugated diene unit is preferably 1 mol % or more, more preferably 5 mol % or more, and still more preferably 10 mol % or more, and is preferably 50 mol % or less, more preferably 40 mol % or less, and still more preferably 30 mol % or less.

When the content of the conjugated diene unit is 1 to 50 mol % of the entire copolymer of the present invention, the mechanical strength and the impact resistance of the laminated body can be improved.

From a viewpoint of further improving the mechanical strength and the impact resistance of the laminated body, the content of the conjugated diene unit is preferably in a range of 1 to 50 mol %, more preferably in a range of 5 to 40 mol %, and still more preferably in a range of 10 to 30 mol % of the entire copolymer of the present invention.

(Non-Conjugated Olefin Unit)

The non-conjugated olefin unit is a structural unit derived from a non-conjugated olefin compound serving as a monomer.

Here, the non-conjugated olefin compound refers to a compound that is an aliphatic unsaturated hydrocarbon and that has one or more carbon-carbon double bonds. The non-conjugated olefin compound preferably has 2 to 10 carbon atoms. Specifically, examples of such a non-conjugated olefin compound include α-olefins such as ethylene, propylene, 1-butene, 1-pentene, 1-hexene, 1-heptene, and 1-octene, and hetero atom-substituted alkene compounds such as vinyl pivalate, 1-phenylthioethene, and N-vinylpyrrolidone. The non-conjugated olefin compound may be used either alone or in combination of two or more thereof.

The non-conjugated olefin compound serving as the monomer of the copolymer of the present invention is preferably an acyclic non-conjugated olefin compound from the viewpoint of improving the mechanical strength and the impact resistance of the laminated body and facilitating repair. Further, the acyclic non-conjugated olefin compound is more preferably an α-olefin, still more preferably an α-olefin containing ethylene, and is particularly preferably consisting of only ethylene.

In other words, the non-conjugated olefin unit in the copolymer of the present invention is preferably an acyclic non-conjugated olefin unit. Further, the acyclic non-conjugated olefin unit is more preferably an α-olefin unit, still more preferably an α-olefin unit containing an ethylene unit, and is particularly preferably consisting of only an ethylene unit.

When the copolymer of the present invention is the binary copolymer, the content of the non-conjugated olefin unit is preferably 50 mol % or more and less than 100 mol %. In this case, breaking properties of the laminated body at a high temperature can be effectively improved. From a similar viewpoint, a proportion of the non-conjugated olefin unit in the binary copolymer is more preferably 60 mol % or more.

When the copolymer of the present invention is the ternary copolymer or the multi-component copolymer, the content of the non-conjugated olefin unit is preferably 40 mol % or more, more preferably 45 mol % or more, still more preferably 55 mol % or more, and particularly preferably 60 mol % or more, and is preferably 97 mol % or less, more preferably 95 mol % or less, and still more preferably 90 mol % or less. When the content of the non-conjugated olefin unit is 40 to 97 mol % of the entire copolymer of the present invention, the mechanical strength and the impact resistance of the laminated body can be improved and repair can be facilitated.

From a viewpoint of further improving the mechanical strength and the impact resistance of the laminated body and further facilitating the repair, the content of the non-conjugated olefin unit is preferably in a range of 40 to 97 mol %, more preferably in a range of 45 to 95 mol %, still more preferably in a range of 55 to 90 mol %, and yet still more preferably in a range of 60 to 90 mol % of the entire copolymer of the present invention.

(Aromatic Vinyl Unit)

The copolymer of the present invention preferably further contains the aromatic vinyl unit.

The aromatic vinyl unit is a structural unit derived from an aromatic vinyl compound serving as a monomer.

When the copolymer of the present invention contains the aromatic vinyl unit, excessive crystallization derived from the non-conjugated olefin unit is prevented, and while rigidity of the copolymer of the present invention is improved, elasticity is hardly worsened, and high crack resistance can be obtained.

Here, the aromatic vinyl compound refers to an aromatic compound substituted with at least a vinyl group, and that does not fall within a conjugated diene compound. The aromatic vinyl compound preferably has 8 to 10 carbon atoms. Examples of such an aromatic vinyl compound include styrene, o-methylstyrene, m-methylstyrene, p-methylstyrene, o,p-dimethylstyrene, o-ethylstyrene, m-ethylstyrene, and p-ethylstyrene. The aromatic vinyl compound may be used either alone or in combination of two or more thereof.

The aromatic vinyl compound serving as the monomer of the copolymer of the present invention preferably includes styrene, and is more preferably consisting of only styrene from the viewpoint of improving the mechanical strength and the impact resistance of the laminated body. In other words, the aromatic vinyl unit in the copolymer of the present invention preferably includes a styrene unit, and is more preferably consisting of only styrene unit.

An aromatic ring in the aromatic vinyl unit is not contained in a main chain of the copolymer of the present invention as long as the aromatic ring does not bond to an adjacent unit.

When the copolymer of the present invention is the ternary copolymer or the multi-component copolymer, a content of the aromatic vinyl unit is preferably 2 mol % or more, and more preferably 3 mol % or more, and is preferably 35 mol % or less, more preferably 30 mol % or less, and still more preferably 25 mol % or less. When the content of the aromatic vinyl unit is 2 to 35 mol % of the entire copolymer of the present invention, the mechanical strength and the impact resistance of the laminated body can be improved.

From a viewpoint of further improving the mechanical strength and the impact resistance of the laminated body, the content of the aromatic vinyl unit is preferably in a range of 2 to 35 mol %, more preferably in a range of 3 to 30 mol %, and still more preferably in a range of 3 to 25 mol %, based on the entire copolymer of the present invention.

From a viewpoint of obtaining a desirable effect of the present invention, a content of another structural unit other than the conjugated diene unit, the non-conjugated olefin unit, and the aromatic vinyl unit is preferably 30 mol % or less, more preferably 20 mol % or less, still more preferably 10 mol % or less of the entire copolymer of the present invention, and it is particularly preferable that the structural unit is not contained, that is, the content is 0 mol %. That is, the copolymer of the present invention is preferably a binary copolymer consisting of two types of units that include the conjugated diene unit and the non-conjugated olefin unit, or a ternary copolymer consisting of three types of units that include the conjugated diene unit, the non-conjugated olefin unit, and the aromatic vinyl unit.

From the viewpoint of improving the mechanical strength and the impact resistance of the laminated body, the copolymer of the present invention is preferably a polymer obtained by using and polymerizing at least only one type of conjugated diene compound, only one type of non-conjugated olefin compound, and one type of aromatic vinyl compound as monomers.

In other words, the copolymer of the present invention is preferably a copolymer containing only one type of conjugated diene unit, only one type of non-conjugated olefin unit, and only one type of aromatic vinyl unit, more preferably a ternary copolymer only consisting of only one type of conjugated diene unit, only one type of non-conjugated olefin unit, and only one type of aromatic vinyl unit, and still more preferably a ternary copolymer only consisting of a 1,3-butadiene unit, an ethylene unit, and a styrene unit. Here, conjugated diene units having different bonding modes fall within "only one type of conjugated diene unit".

When the copolymer of the present invention is the binary copolymer, the content of the conjugated diene unit is preferably more than 0 mol % and 50 mol % or less, and the content of the non-conjugated olefin unit is preferably 50 mol % or more and less than 100 mol %.

When the copolymer of the present invention is the ternary copolymer, the content of the conjugated diene unit is preferably 1 to 50 mol %, the content of the non-conjugated olefin unit is preferably 40 to 97 mol %, and the content of the aromatic vinyl unit is preferably 2 to 35 mol %.

Regarding the copolymer of the present invention, a weight-average molecular weight (Mw) as expressed in terms of polystyrene is preferably 10,000 to 9,000,000 (10 to 9,000 kg/mol), and more preferably 100,000 to 8,000,000 (100 to 8,000 kg/mol). When the Mw of the copolymer of the present invention is 10,000 or more, the mechanical strength and the impact resistance of the laminated body can be sufficiently ensured, and when the Mw is 9,000,000 or less, workability of the composition is hardly worsened.

Regarding the copolymer of the present invention, a number-average molecular weight (Mn) as expressed in terms of polystyrene is preferably 10,000 to 10,000,000 (10 to 10,000 kg/mol), more preferably 50,000 to 9,000,000 (50 to 9,000 kg/mol), and still more preferably 100,000 to 8,000,000 (100 to 8,000 kg/mol). When the Mn of the copolymer of the present invention is 10,000 or more, the mechanical strength and the impact resistance of the laminated body can be sufficiently ensured, and when the Mn is 10,000,000 or less, the workability of the composition is hardly worsened.

Regarding the copolymer of the present invention, a molecular weight distribution [Mw/Mn (weight-average molecular weight/number-average molecular weight)] is preferably 1.00 to 4.00, more preferably 1.00 to 3.50, and still more preferably 1.80 to 3.00. When the molecular weight distribution of the copolymer of the present invention is 4.00 or less, sufficient homogeneity can be achieved for physical properties of the copolymer of the present invention.

The weight-average molecular weight (Mw), the number-average molecular weight (Mn) and the molecular weight distribution (Mw/Mn) of the copolymer of the present invention can be determined by gel permeation chromatography (GPC) using polystyrene as a standard substance.

Regarding the copolymer of the present invention, endothermic peak energy at 0 to 120° C., as measured by a differential scanning calorimeter (DSC), is preferably 10 to 150 J/g, and more preferably 30 to 120 J/g. When the endothermic peak energy of the copolymer of the present invention is 10 J/g or more, crystallinity of the copolymer of the present invention can be increased, and the crack resistance of the laminated body can be improved. Further, when the endothermic peak energy of the copolymer of the present invention is 150 J/g or less, the workability of the composition is improved.

The endothermic peak energy of the copolymer of the present invention may be measured using a differential scanning calorimeter according to JIS K 7121-1987, for example, by heating the copolymer from −150° C. to 150° C. at a heating rate of 10° C./min.

Regarding the copolymer of the present invention, a melting point measured by the differential scanning calorimeter (DSC) is preferably 30 to 130° C., and more preferably 30 to 110° C. When the melting point of the copolymer of the present invention is 30° C. or higher, the crystallinity of the copolymer of the present invention can be increased, and the crack resistance of the laminated body can be improved. Further, when the melting point of the copolymer of the present invention is 130° C. or lower, the workability of the composition is improved.

The melting point of the copolymer of the present invention may be measured using the differential scanning calorimeter according to JIS K 7121-1987.

Regarding the copolymer of the present invention, a glass transition temperature (Tg) measured by the differential scanning calorimeter (DSC) is preferably 0° C. or lower, and more preferably −100 to −10° C. When the glass transition temperature of the copolymer of the present invention is 0° C. or lower, the mechanical strength and the impact resistance of the laminated body can be further improved.

The glass transition temperature of the copolymer of the present invention may be measured using the differential scanning calorimeter according to JIS K 7121-1987.

Regarding the copolymer of the present invention, a degree of crystallinity is preferably 0.5 to 50%, more preferably 3 to 45%, and still more preferably 5 to 45%. When the degree of crystallinity of the copolymer of the present invention is 0.5% or more, the crystallinity of the copolymer caused by the non-conjugated olefin unit can be sufficiently ensured, and the mechanical strength and the impact resistance of the laminated body can be further improved. Further, when the degree of crystallinity of the copolymer of the present invention is 50% or less, workability during kneading of the composition is improved, and extrusion processability thereof is also improved.

Regarding the degree of crystallinity of the copolymer of the present invention, the degree of crystallinity may be calculated by measuring crystal melting energy of polyethylene having 100% of a crystal component and melting peak energy of the copolymer of the present invention, and calculated based on an energy ratio of the polyethylene to the copolymer of the present invention. Further, the melting peak energy can be measured by the differential scanning calorimeter.

In the copolymer of the present invention, the main chain preferably only has an acyclic structure. Accordingly, the mechanical strength and the impact resistance of the laminated body can be further improved.

In order to check whether the main chain of the copolymer of the present invention has a cyclic structure, NMR is used as a main measuring method. Specifically, when peaks derived from the cyclic structure existing in the main chain (for example, peaks appearing at 10 to 24 ppm for three-membered to five-membered rings) are not observed, it indicates that the main chain of the copolymer only has an acyclic structure.

In the present invention, the main chain of the polymer means a linear molecular chain to which all molecular chains (long-molecular chain or short-molecular chain, or both the two) other than the main chain are connected like pendants [see Section 1.34 of "Glossary of Basic Terms in Polymer Science IUPAC Recommendations 1996", Pure Appl. Chem., 68, 2287-2311 (1996)].

Further, the acyclic structure means a linear structure or a branched structure.

The copolymer of the present invention is excellent in mechanical strength, and specifically, excellent in breaking strength, stepping strength, tensile strength, abrasion resistance, crack resistance, and the like. The copolymer of the present invention is also excellent in the mechanical strength at a low temperature.

Further, since the copolymer of the present invention is excellent in the mechanical strength without relying on a filler such as carbon black or silica, the copolymer can be colored using a colorant and is excellent in decorativeness. On the other hand, since the copolymer of the present invention can interact with the filler, the mechanical strength can be further improved by using the filler.

Since the copolymer of the present invention contains the conjugated diene unit, crosslinking is possible, and a crosslinking rate is the same as that of a diene-based rubber. Since the copolymer of the present invention contains the conjugated diene unit, the copolymer acts as an elastic body and can expand and contract. Since the copolymer of the present invention can be injection-molded and can also be stretched, the copolymer can be processed in a film shape. Since the copolymer of the present invention contains the conjugated diene unit and the non-conjugated olefin unit, the copolymer is easily adhered to both an olefin resin and a rubber, and therefore the copolymer can function as an adhesive between the olefin resin and the rubber. The copolymer of the present invention can be foamed. The copolymer of the present invention preferably has a melting point of 30 to 130° C., and a shape can be repaired by applying hot water of about 80 to 100° C. or by performing heating to such an extent that the copolymer is immersed in the hot water. Further, the copolymer of the present invention has shape memory properties.

When the binary copolymer consisting of two types of units that include the conjugated diene unit and the non-conjugated olefin unit is manufactured as the copolymer of the present invention, the copolymer of the present invention can be manufactured through a polymerization step using the conjugated diene compound and the non-conjugated olefin compound as monomers.

When the ternary copolymer consisting of three types of units that include the conjugated diene unit, the non-conjugated olefin unit, and the aromatic vinyl unit is manufactured as the copolymer of the present invention, the copolymer of the present invention can be manufactured through a polymerization step using the conjugated diene compound, the non-conjugated olefin compound, and the aromatic vinyl compound as monomers.

A method for manufacturing the copolymer of the present invention may further include a coupling step, a washing step, and other steps if necessary.

Hereinafter, the method for manufacturing the copolymer of the present invention will be described as a representative of a case where the ternary copolymer is manufactured.

In manufacturing of the polymer, it is preferable to add only the non-conjugated olefin compound and the aromatic vinyl compound without adding the conjugated diene compound and then polymerize the non-conjugated olefin compound and the aromatic vinyl compound in presence of a polymerization catalyst. Particularly, when a catalyst composition described later is used, the conjugated diene compound has higher reactivity than the non-conjugated olefin compound and the aromatic vinyl compound, and therefore it is difficult to polymerize either one or both of the non-conjugated olefin compound and the aromatic vinyl compound in the presence of the conjugated diene compound. Further, it is also difficult to previously polymerize the conjugated diene compound and thereafter polymerize the non-conjugated olefin compound and the aromatic vinyl compound in a mode of additive polymerization, in view of properties of the catalyst.

As the polymerization method, any method such as a solution polymerization method, a suspension polymerization method, a liquid-phase bulk polymerization method, an emulsion polymerization method, a vapor-phase polymerization method, and a solid-phase polymerization method can be used. Further, when a solvent is used for the polymerization reaction, the solvent may be inert in the polymerization reaction. Examples of the solvent include toluene, cyclohexane, and normal hexane.

The polymerization step may be performed in one stage, or may be performed in multiple stages including two or more stages.

The one-stage polymerization step is a step of simultaneously reacting and polymerizing all types of monomers to be polymerized, that is, the conjugated diene compound, the non-conjugated olefin compound, the aromatic vinyl compound, and other monomers, preferably the conjugated diene compound, the non-conjugated olefin compound, and the aromatic vinyl compound.

Further, the multi-stage polymerization step is a step of first reacting a part or all of one or two types of monomers to form a polymer (first polymerization stage), and then adding thereto remaining types of monomers not added in the first polymerization stage and a remaining part of the monomer added in the first polymerization stage and polymerizing them in one or more stages (a second polymerization stage to a final polymerization stage). Particularly, in manufacturing of the copolymer of the present invention, the polymerization step is preferably performed in multiple stages.

In the polymerization step, the polymerization reaction is preferably performed in an atmosphere of an inert gas, preferably a nitrogen gas or an argon gas. A polymerization temperature of the polymerization reaction is not particularly limited, but is preferably in a range of, for example, $-100°$ C. to $200°$ C., and may also be around room temperature. Further, a pressure of the polymerization reaction is preferably in a range of 0.1 to 10.0 MPa in order to sufficiently incorporate the conjugated diene compound into a polymerization reaction system.

Further, a reaction time of the polymerization reaction is also not particularly limited, is preferably in a range of, for example, 1 second to 10 days, and can be appropriately selected depending on conditions such as a type of the polymerization catalyst and a polymerization temperature.

Further, in the polymerization step of the conjugated diene compound, polymerization may be stopped using a polymerization terminator such as methanol, ethanol, and isopropanol.

The polymerization step is preferably performed in multiple stages. More preferably, a first step of mixing a first monomer raw material containing at least the aromatic vinyl compound with the polymerization catalyst to obtain a polymerization mixture, and a second step of introducing a second monomer raw material containing at least one type selected from the group consisting of the conjugated diene compound, the non-conjugated olefin compound, and the aromatic vinyl compound into the polymerization mixture are preferably carried out. Further, it is more preferable that the first monomer raw material does not contain the conjugated diene compound, and the second monomer raw material contains the conjugated diene compound.

The first monomer raw material used in the first step may contain the non-conjugated olefin compound together with the aromatic vinyl compound. Further, the first monomer raw material may contain a total amount of the aromatic vinyl compound to be used, or may contain only a part thereof. Further, the non-conjugated olefin compound is contained in at least one of the first monomer raw material and the second monomer raw material.

The first step is preferably performed in a reactor in the atmosphere of the inert gas, preferably the nitrogen gas or the argon gas. A temperature (reaction temperature) in the first step is not particularly limited, is preferably in a range of, for example, $-100°$ C. to $200°$ C., and can be around a room temperature. Further, a pressure in the first step is not particularly limited, and is preferably in a range of 0.1 to 10.0 MPa in order to sufficiently incorporate the aromatic vinyl compound into the polymerization reaction system. Further, a time (reaction time) spent in the first step can be appropriately selected depending on conditions such as a type of the polymerization catalyst and a reaction temperature, and for example, when the reaction temperature is 25 to $80°$ C., the time (reaction time) is preferably in a range of 5 minutes to 500 minutes.

In the first step, as a polymerization method for obtaining the polymerization mixture, any method such as the solution polymerization method, the suspension polymerization method, the liquid-phase bulk polymerization method, the emulsion polymerization method, the vapor-phase polymerization method, and the solid-phase polymerization method can be used. Further, when a solvent is used for the polymerization reaction, the solvent may be inert in the polymerization reaction. Examples of the solvent include toluene, cyclohexanone, and normal hexane.

The second monomer raw material used in the second step is preferably only the conjugated diene compound, the conjugated diene compound and the non-conjugated olefin compound, the conjugated diene compound and the aromatic vinyl compound, or the conjugated diene compound, the non-conjugated olefin compound, and the aromatic vinyl compound.

When the second monomer raw material contains at least one selected from a group consisting of the non-conjugated olefin compound and the aromatic vinyl compound in addition to the conjugated diene compound, these monomer raw materials may be mixed with the solvent or the like in advance and then introduced into a polymerization mixture, or each monomer raw material may be introduced from a single state. Further, the monomer raw materials may be added simultaneously or may be added sequentially.

In the second step, the method for introducing the second monomer raw material into the polymerization mixture is not particularly limited, and it is preferable to continuously add the monomer raw materials to the polymerization mixture by controlling a flow rate of each monomer raw material (so-called metering). Here, when the monomer raw material (for example, ethylene or the like serving as the non-conjugated olefin compound under a condition at a room temperature and a normal pressure) that is a gas under a condition of the polymerization reaction system is used, the monomer raw material can be introduced into the polymerization reaction system at a predetermined pressure.

The second step is preferably performed in the reactor in the atmosphere of the inert gas, preferably the nitrogen gas or the argon gas. A temperature (reaction temperature) in the second step is not particularly limited, is preferably in a range of, for example, $-100°$ C. to $200°$ C., and can be around a room temperature. When the reaction temperature is increased, selectivity of cis-1,4 bonds in the conjugated diene unit may be reduced. Further, a pressure in the second step is not particularly limited, and is preferably in a range of 0.1 to 10.0 MPa in order to sufficiently incorporate a monomer such as the conjugated diene compound into the polymerization reaction system. Further, a time (reaction time) spent in the second step can be appropriately selected depending on conditions such as a type of the polymerization catalyst and a reaction temperature, and is preferably in a range of, for example, 0.1 hours to 10 days.

Further, in the second step, the polymerization reaction may be stopped using the polymerization terminator such as methanol, ethanol, and isopropanol.

Here, the polymerization step of the conjugated diene compound, the non-conjugated olefin compound, and the aromatic vinyl compound preferably includes a step of polymerizing various monomers in presence of one or more of the following components (a) to (f) as a catalyst component. In the polymerization step, it is preferable to use one or more of the following components (a) to (f), and it is more preferable to use two or more of the following components (a) to (f) in combination as a catalyst composition.

Component (a): a rare earth element compound or a reaction product of the rare earth element compound and a Lewis base Component (b): an organic metal compound Component (c): an aluminoxane Component (d): an ionic compound Component (e): a halogen compound Component (f): a cyclopentadiene skeleton-containing compound selected from a cyclopentadiene (a compound having a cyclopentadienyl group) having or not having a substituent, an indene (a compound having an indenyl group) having or not having a substituent, and a fluorene (a compound having a fluorenyl group) having or not having a substituent The components (a) to (f) can be used in the polymerization step with reference to, for example, WO 2018/092733 or the like.

The coupling step is a step of performing a reaction (coupling reaction) of modifying at least a part (for example, a terminal) of a polymer chain of the copolymer obtained in the polymerization step.

In the coupling step, the coupling reaction is preferably performed when the polymerization reaction reaches 100%.

A coupling agent used in the coupling reaction is not particularly limited and can be appropriately selected depending on an intended purpose. Examples thereof include: a tin-containing compound such as bis(maleic acid-1-octadecyl)dioctyltin(IV); an isocyanate compound such as 4,4'-diphenylmethane diisocyanate; and an alkoxysilane compound such as glycidylpropyltrimethoxysilane. These may be used either alone or in combination of two or more thereof.

Among these, bis(maleic acid-1-octadecyl)dioctyltin(IV) is preferable from a viewpoint of reaction efficiency and low gel formation.

When the coupling reaction is performed, the number-average molecular weight (Mn) of the copolymer can be increased.

The washing step is a step of washing the copolymer obtained in the polymerization step.

A medium to be used for washing is not particularly limited and can be appropriately selected depending on an intended purpose. Examples thereof include methanol, ethanol, and isopropanol. When a catalyst derived from a Lewis acid is used as the polymerization catalyst, particularly, an acid (for example, hydrochloric acid, sulfuric acid, and nitric acid) can be added to these solvents and used. An amount of the acid to be added is preferably 15 mol % or less with respect to the solvent. When the addition amount is 15 mol % or less, the acid hardly remains in the copolymer, and a reaction during kneading and vulcanization of the composition is hardly adversely influenced.

Through the washing step, a catalyst residue amount in the copolymer can be suitably reduced.

From a viewpoint of the mechanical strength, the impact resistance, and ease of repair of the laminated body, a content of the copolymer of the present invention in the composition (c) is preferably 10 to 100% by mass, more preferably 30 to 100% by mass, still more preferably 51 to 100% by mass, and yet still more preferably 70 to 100% by mass.

The composition (c) may further contain a polymer component other than the copolymer of the present invention.

Examples of the polymer component include a resin, an elastomer, and a rubber component.

[Resin and Elastomer]

Examples of the resin and the elastomer include: an olefin-based resin such as a polyethylene-based resin and a polypropylene-based resin; a polyamide-based resin; a polyester-based thermoplastic elastomer; and a polyester-based resin such as polybutylene terephthalate and polybutylene naphthalate. These may be used either alone or in combination of two or more thereof.

For example, types of the polyethylene-based resin include ultra-low-density polyethylene (VLDPE), low-density polyethylene (LDPE), linear low-density polyethylene (LLDPE), medium-density polyethylene (MDPE), and high-density polyethylene (HDPE), and any one of them may be used.

[Rubber Component]

Examples of the rubber component include natural rubber (NR), and diene-based rubber such as synthetic diene-based rubber.

Specific examples of the synthetic diene-based rubber include polyisoprene rubber (IR), polybutadiene rubber (BR), styrene-butadiene copolymer rubber (SBR), chloroprene rubber (CR), halogenated butyl rubber, and acrylonitrile-butadiene rubber (NBR).

The diene-based rubber may be used either alone or in combination of two or more thereof. Further, the diene-based rubber may be modified.

The rubber component may contain non-diene-based rubber.

[Various Components]

In the composition (c), various components generally used in a resin field and a rubber field, for example, a functional component such as a filler, a reinforcing fiber, an antioxidant, a softener, a crosslinking package containing a stearic acid, zinc oxide, a crosslinking accelerator, and a crosslinking agent, a resin, an ultraviolet absorber, a foaming agent, and a colorant, in addition to the copolymer and the polymer component of the present invention, can be appropriately selected and mixed in a range in which an object of the present invention is not impaired. As the various components, commercially available products can be suitably used.

(Filler)

Examples of the filler include carbon black and an inorganic filler.

When the composition contains the rubber component, by further containing the filler, a mechanical strength and impact resistance of vulcanized rubber can be improved, and the mechanical strength and the impact resistance of the laminated body can be improved.

A type of the carbon black is not particularly limited. Examples thereof include GPF, FEF, HAF, ISAF, and SAF, and HAF, ISAF, and SAF are preferable.

Examples of the inorganic filler include metal oxides such as silica, alumina, and titania, and the silica is preferable among them. A type of the silica is not particularly limited. Examples of the silica include wet method silica (hydrous silicic acid), dry method silica (anhydrous silicic acid), and colloidal silica. When the silica is contained as a filler, in order to improve dispersibility of the silica in the composition of the present invention, the composition may further contain a silane coupling agent.

(Antioxidant)

Examples of the antioxidant include an amine-ketone-based compound, an imidazole-based compound, an amine-based compound, a phenol-based compound, a sulfur-based compound, and a phosphorus-based compound.

(Softener)

Examples of the softener include a petroleum-based softener such as process oil, lubricating oil, naphthenic oil, paraffin, liquid paraffin, petroleum asphalt, and vaseline, a fat-oil-based softener such as castor oil, linseed oil, rapeseed oil, and coconut oil, and waxes such as beeswax, carnauba wax, and lanolin. These softeners may be used either alone or in combination of two or more thereof.

(Crosslinking Agent)

The crosslinking agent is not particularly limited. Examples thereof include normally peroxide, sulfur, oxime, amine, and an ultraviolet curing agent.

The copolymer of the present invention can be cross-linked (vulcanized) by sulfur since the conjugated diene unit is contained. Examples of the sulfur can include powdered sulfur, precipitated sulfur, colloidal sulfur, surface-treated sulfur, and insoluble sulfur.

(Crosslinking Accelerator)

When the composition of the present invention contains the rubber component, in order to accelerate vulcanization of the rubber component, the composition may contain the crosslinking accelerator (vulcanization accelerator).

Examples of the vulcanization accelerator include a guanidine-based vulcanization accelerator, a sulfenamide-based vulcanization accelerator, a thiuram-based vulcanization accelerator, a thiazole-based vulcanization accelerator, an aldehyde-amine-based vulcanization accelerator, and a thiocarbamic-acid-salt-based vulcanization accelerator.

[Method for Manufacturing Composition (c)]

The composition (c) may be manufactured using the copolymer of the present invention as it is, or by mixing any additive component with the copolymer of the present invention.

Further, the composition (c) may be manufactured by kneading the copolymer of the present invention alone or kneading the copolymer together with any other additive components by using a kneader such as a single-screw extrusion kneader, a twin-screw extrusion kneader, a Banbury mixer, a roll, and an internal mixer.

It is preferable that the components mixed in manufacturing of the composition (c) are mixed in an amount shown as a content of each component in the composition (c), which is defined as a mixing amount.

The kneading of the components may be performed in one stage in total, or may be separately performed in two or more stages.

When the components of the composition (c) are melt-kneaded by the extrusion kneader to extrude the composition (c), the extruded composition may be directly cut into pellets, or after forming strands, the strands may be cut with a pelletizer into pellets. A shape of the pellet can be a general shape such as a cylinder, a prism, or a sphere.

[Composition (r)]

The layer (R) is consisting of the composition (r) containing an olefin-based resin.

The composition (r) may contain various functional components and the like in addition to the olefin-based resin.

[Olefin-Based Resin]

The olefin-based resin refers to a resin in which at least polyolefin has crystallinity and which forms a main component of the resin. Examples thereof include an olefin-α-olefin copolymer and an olefin copolymer, which may be modified.

Specific examples thereof include a polymer such as polyethylene, an ethylene-propylene copolymer, an ethylene-hexene copolymer, an ethylene-pentene copolymer, an ethylene-octene copolymer, a propylene-1-hexene copolymer, an ethylene-4-methyl-pentene copolymer, a propylene-4-methyl-1-pentene copolymer, an ethylene-butene copolymer, a propylene-butene copolymer, a 1-butene-hexene copolymer, a 1-butene-4-methyl-pentene copolymer, an ethylene-methacrylic acid copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, an ethylene-butyl acrylate copolymer, an ethylene-vinyl acetate copolymer, a propylene-methacrylic acid copolymer, a propylene-methyl methacrylate copolymer, a propylene-ethyl methacrylate copolymer, a propylene-butyl methacrylate copolymer, a propylene-methyl acrylate copolymer, a propylene-ethyl acrylate copolymer, a propylene-butyl acrylate copolymer, and a propylene-vinyl acetate copolymer.

The olefin-based resin preferably contains a non-conjugated olefin unit. When the olefin-based resin contains the non-conjugated olefin unit, the adhesiveness and the adhesion between the layer (C) and the layer (R) are improved, and the mechanical strength and the impact resistance of the laminated body are further improved.

From a viewpoint of further improving the adhesion between the layer (C) and the layer (R), the olefin-based resin preferably contains an olefin unit having 2 to 5 carbon atoms, and it is more preferable that a difference between the number of carbon atoms in the non-conjugated olefin unit contained in the copolymer of the present invention and the number of carbon atoms in the non-conjugated olefin unit contained in the olefin-based resin is 2 or less.

When the copolymer of the present invention and the olefin-based resin each contain the non-conjugated olefin unit that is a common unit and further have a structure in which the non-conjugated olefin units are similar, the adhesiveness between the layer (C) and the layer (R) is further improved. As a result, when the laminated body is bent, the layer (C) having elasticity and flexibility follows the layer (R), so that the laminated body hardly cracks, and the laminated body is also excellent in the mechanical strength and the impact resistance.

The difference between the number of the carbon atoms in the non-conjugated olefin unit contained in the copolymer of the present invention and the number of the carbon atoms in the non-conjugated olefin unit contained in the olefin-based resin is more preferably 1 or less, and still more preferably 0. Further, the number of carbon atoms in the olefin unit is more preferably 2 to 4, and still more preferably 2 to 3, that is, the polyethylene-based resin and the polypropylene-based resin are still more preferable.

The polyethylene-based resin means a polymer containing an ethylene unit as a main component (for example, more than 50 mol %) in a main chain, and may further contain another unit such as a propylene unit. Further, the polyethylene-based resin may be thermosetting or thermoplastic. Specific examples thereof include polyethylene (homopolymer) and an ethylene-propylene copolymer (where the content of the ethylene unit is more than 50 mol %).

Further, types of the polyethylene-based resin include the ultra-low-density polyethylene (VLDPE), the low-density polyethylene (LDPE), the linear low-density polyethylene (LLDPE), the medium-density polyethylene (MDPE), and the high-density polyethylene (HDPE), and any one of them may be used.

Among these, from a viewpoint of high versatility, as the polyethylene-based resin, it is preferable to use one or more selected from a group consisting of the high-density polyethylene (HDPE) and the linear low-density polyethylene (LLDPE).

The polypropylene-based resin means a polymer containing a propylene unit as a main component (for example, more than 50 mol %) in a main chain, and may further contain another unit such as an ethylene unit. Further, the polypropylene-based resin may be thermosetting or thermoplastic. Specific examples thereof include polypropylene (homopolymer) and the ethylene-propylene copolymer (where the content of the propylene unit is more than 50 mol %).

From a viewpoint of improving the mechanical strength and the impact resistance of the laminated body, a number-average molecular weight (Mn) of the olefin-based resin as expressed in terms of polystyrene is preferably 5 to 10,000 kg/mol, more preferably 7 to 1,000 kg/mol, and still more preferably 10 to 1,000 kg/mol.

From the viewpoint of improving the mechanical strength and the impact resistance of the laminated body, a weight-average molecular weight (Mw) of the olefin-based resin is preferably 100 to 300 kg/mol, more preferably 180 to 300 kg/mol, and still more preferably 200 to 280 kg/mol.

The number-average molecular weight (Mn) and the weight-average molecular weight (Mw) of the olefin-based resin can be measured by the gel permeation chromatography (GPC). For example, gel permeation chromatography (GPC) such as "HLC-8321GPC/HT" manufactured by Tosoh Corporation can be used.

From the viewpoint of the mechanical strength and the impact resistance of the laminated body, a content of the olefin-based resin in the composition (r) is preferably 10 to 100% by mass, more preferably 30 to 100% by mass, still more preferably 51 to 100% by mass, and yet still more preferably 70 to 100% by mass.

The composition (r) may further contain a polymer component other than the olefin-based resin.

Examples of the polymer component include the resin, the elastomer, and the rubber component that can be contained in the composition (c).

In the composition (r), various components generally used in a resin field and a rubber field, for example, a functional component such as a filler, a reinforcing fiber, an antioxidant, a softener, a crosslinking package containing a stearic acid, zinc oxide, a crosslinking accelerator, and a crosslinking agent, a resin, an ultraviolet absorber, a foaming agent, and a colorant, in addition to the olefin-based resin and the polymer component, can be appropriately selected and mixed in a range in which an object of the present invention is not impaired. As the various components, commercially available products can be suitably used. Details of the functional components that can be contained in the composition (r) are the same as those of the components described as the functional components that can be contained in the composition (c).

[Method for Manufacturing Composition (r)]

The composition (r) may be manufactured by using the olefin-based resin as it is, or by mixing any additive component with the olefin-based resin.

The composition (r) can be manufactured by a method similar to that of the composition (c).

[Method for Manufacturing Laminated Body]

The laminated body of the present invention may be manufactured by melting and kneading the composition (c) and the composition (r) respectively, and then co-extruding them, or may be manufactured by manufacturing a sheet (layer (C)) consisting of the composition (c) and a sheet (layer (R)) consisting of the composition (r) respectively, and then bonding them together, followed by hot pressing.

A hot pressing temperature is preferably 120 to 160° C., and more preferably 130 to 150° C.

Each of the layer (C) and the layer (R) may be independently formed into a foamed layer by mixing a foaming agent in the composition (c) or the composition (r), or may be subjected to a surface treatment by applying a solvent to a surface of the layer, or by irradiation with electron beams, irradiation with microwaves, or the like.

The copolymer of the present invention contained in the layer (C) is excellent in the mechanical strength, has elasticity, and is also excellent in thermal repair properties, shape memory properties, decoration properties, adhesiveness to the diene-based rubber, and the like, and therefore the layer (C) can also have similar functions. For example, the layer (C) can be decorated, and the laminated body can also be adhered to a rubber member via the layer (C).

<Product>

A product of the present invention uses the laminated body of the present invention.

Since the laminated body of the present invention is excellent in the mechanical strength and the impact resistance and easy to repair, the laminated body can be used for manufacturing products of various applications. For example, the laminated body is suitable for tires and automobile parts (automobile seats, automobile batteries (lithium ion batteries and the like), weather strips, hose tubes, anti-vibration rubbers, cables, sealing materials, and the like), ship parts, building materials, and the like.

In addition, the laminated body of the present invention is suitable for conveyor belts, crawlers, anti-vibration rubbers, hoses, resin piping, sound-absorbing materials, bedclothes, precision parts for office machinery (OA rollers), bicycle frames, golf balls, tennis rackets, golf shafts, resin additives, filters, adhesives, pressure-sensitive adhesives, inks, medical instruments (medical tubes, bags, microneedles, rubber sleeves, artificial organs, caps, packings, syringe gaskets, medicine stoppers, artificial legs, artificial limbs), cosmetics (UV powders, puffs, containers, waxes, shampoos, conditioners), detergents, building materials (floor materials, vibration control rubbers, seismic isolation rubbers, building films, sound-absorbing materials, water-proof sheets, heat-insulating materials, joint materials, sealing materials), packaging materials, liquid-crystal materials, organic EL materials, organic semiconductor materials, electronic materials, electronic devices, communication machinery, aircraft parts, mechanical parts, electronic parts, agricultural materials, electric wires, cables, fibers (wearable bases), daily necessaries (toothbrushes, shoe soles, glasses, lures, binoculars, toys, dust masks, garden hoses), robot parts, optical parts, road materials (asphalt, guardrails, poles, signs), protectors (shoes, stepping prevention safety shoes, bulletproof vests), exterior parts for electrical machinery, OA exterior parts, soles, sealing materials, and the like.

In the above description, OA means office automation, UV means ultraviolet, and EL means electro-luminescence.

Among the above, the laminated body of the present invention is preferably used as an industrial product, a container, and a packaging material, and the product of the present invention is preferably an industrial product, a container, or a packaging material using the laminated body of the present invention.

EXAMPLES

Hereinafter, the present invention will be described in more detail with reference to examples, but these Examples are for the purpose of exemplifying the present invention and do not limit the present invention in any way.

<Components>

Copolymer (P1): a ternary copolymer manufactured by the following manufacturing method Olefin-based resin (HDPE): high-density polyethylene, manufactured by Mitsubishi Chemical Corporation, product name "Novatec HD"

Copolymer (P101): a SEBS sheet, manufactured by Asahi Kasei Corporation, product name "TAFTEC"

[Manufacturing of Copolymer (P1)]

To a sufficiently dried 2000 mL pressure-resistant stainless steel reactor, 82 g of styrene and 680 g of toluene were added.

In a glove box in a nitrogen atmosphere, 0.037 mmol of a mono-(bis(1,3-tert-butyldimethylsilyl) indenyl) bis(bis(dimethylsilyl)amide)gadolinium complex $(1,3[(t-Bu)Me_2Si]_2 C_9H_5Gd[N(SiHMe_2)_2])$ and 0.037 mmol of dimethylanilinium tetrakis(pentafluorophenyl)borate $[Me_2NHPhB (C_6F_5)_4]$ were charged into a glass-made container, and 25 g of toluene was added thereto to prepare a catalyst solution. The catalyst solution was added to the pressure-resistant stainless steel reactor and heated to 60° C.

Next, ethylene was put into the pressure-resistant stainless steel reactor at a pressure of 0.7 MPa, and copolymerization was performed at 75° C. for a total of 2 hours. With a rate of 2 g/min, 240 g of a toluene solution containing 60 g of 1,3-butadiene was continuously added.

Next, 1 mL of an isopropanol solution containing 5% by mass of 2,2'-methylene-bis (4-ethyl-6-t-butylphenol) (NS-5) was added to the pressure-resistant stainless steel reactor to stop the reaction.

Next, a large amount of methanol was used to separate a copolymer, and vacuum drying was performed at 50° C., thereby obtaining the copolymer (P1).

The obtained copolymer (P1) had physical properties shown in Table 1.

TABLE 1

| | | Copolymer (P1) |
|---|---|---|
| Number-average molecular weight (Mn) | kg/mol | 140 |
| Weight-average molecular weight (Mw) | kg/mol | 360 |
| Peak top molecular weight (Mp) | kg/mol | 230 |
| Molecular weight distribution (Mw/Mn) | | 2.5 |
| Content of ethylene unit | mol % | 88 |
| Content of butadiene unit | mol % | 6 |
| Content of styrene unit | mol % | 6 |

TABLE 1-continued

| | | Copolymer (P1) |
|---|---|---|
| Tg | ° C. | −31 |
| Tm-1 | ° C. | 66 |
| Tm-2 | ° C. | 113 |
| $\Delta H_1$ (0 to 100° C.) | J/g | 42 |
| $\Delta H_2$ (100 to 150° C.) | J/g | 5 |
| Degree of crystallinity (0 to 100° C.) | % | 14.4 |
| Degree of crystallinity (100 to 150° C.) | % | 1.6 |

Since no peak was observed at 10 to 24 ppm in a $^{13}$C-NMR spectrum chart, it was confirmed that a main chain of the copolymer (P1) only had an acyclic structure.

The physical properties of the copolymer (P1) were measured by the following method.

[Method for Measuring Physical Properties of Copolymer (P1)]

(1) Number-Average Molecular Weight (Mn), Weight-Average Molecular Weight (Mw), Peak Top Molecular Weight (Mp), and Molecular Weight Distribution (Mw/Mn)

Gel permeation chromatography [GPC: HLC-8121GPC/HT manufactured by Tosoh Corporation, column: $GMH_{HR}$—H(S)HT×2 manufactured by Tosoh Corporation, detector: differential refractometer (RI)] was used to calculate a number-average molecular weight (Mn) as expressed in terms of polystyrene, a weight-average molecular weight (Mw), and a molecular weight distribution (Mw/Mn) of the copolymer based on monodisperse polystyrene. A measurement temperature was 40° C.

(2) Contents of Butadiene Unit, Ethylene Unit, and Styrene Unit

Contents (mol %) of an ethylene unit, a butadiene unit, and a styrene unit in the copolymer were calculated based on an integral ratio of peaks of a 1H-NMR spectrum (100° C., d-tetrachloroethane standard: 6 ppm).

(3) Melting Point (Tm), Glass Transition Temperature (Tg)

The differential scanning calorimeter (DSC, "DSCQ2000" manufactured by TA Instruments Japan Corporation) was used to measure a melting point (Tm) and a glass transition temperature (Tg) of the copolymer according to JIS K 7121-1987. When there are two peaks on a DSC curve, a peak with a lower melting point is shown as Tm−1 and a peak with a higher melting point is shown as Tm−2 in Table 1. When there is one peak, only Tm−1 is shown in Table 1.

(4) Degree of Crystallinity

A temperature of a copolymer sample was increased from −150° C. to 150° C. at 10° C./min, and an endothermic peak energy ($\Delta H_1$) at 0 to 100° C. and an endothermic peak energy ($\Delta H_2$) at 100 to 150° C. at that time were measured.

Further, a crystal melting energy ($\Delta H_0$) of polyethylene having 100% of a crystal component was measured in a similar manner.

A degree of crystallinity (%) derived from the ethylene unit (non-conjugated olefin unit) at 0 to 100° C. was calculated based on a ratio ($\Delta H_1/\Delta H_0$) of the endothermic peak energy ($\Delta H_1$) at 0 to 100° C. of the copolymer to the crystal melting energy ($\Delta H_0$) of the polyethylene, and a degree of crystallinity (%) derived from the ethylene unit (non-conjugated olefin unit) at 100 to 150° C. was calculated based on a ratio ($\Delta H_2/\Delta H_0$) of the endothermic peak energy ($\Delta H_2$) at 100 to 150° C. of the copolymer to the crystal melting energy ($\Delta H_0$) of the polyethylene.

The endothermic peak energy of the copolymer sample and the crystal melting energy of the polyethylene were measured by the differential scanning calorimeter (DSC, "DSCQ2000" manufactured by TA Instruments Japan Corporation). Results are shown in Table 1.

(5) Confirmation of Main Chain Structure

A $^{13}$C-NMR spectrum of the synthesized copolymer was measured.

<Manufacturing of Laminated Body>

1. Manufacturing of Laminated Body 1

A sheet made of the copolymer (P1) having a thickness of 1 mm (referred to as "P1 sheet") and a sheet made of an olefin-based resin (HDPE) having a thickness of 1 mm (referred to as "HDPE sheet") were bonded to each other by a hot-pressing machine (at 115° C.) for 2 minutes to manufacture a laminated body 1 having a thickness of 2 mm.

2. Manufacturing of Laminated Body 2

A P1 sheet having a thickness of 1 mm and a HDPE sheet having a thickness of 1 mm were bonded to each other by the hot-pressing machine (at 100° C.) for 2 minutes to manufacture a laminated body 2 having a thickness of 2 mm.

3. Manufacturing of Laminated Body 101

A sheet made of a copolymer (P101) having a thickness of 1 mm (referred to as "P101 sheet") and a HDPE sheet having a thickness of 1 mm were bonded to each other by the hot-pressing machine (at 115° C.) for 2 minutes to manufacture a laminated body 101 having a thickness of 2 mm.

4. Manufacturing of Laminated Body 102

A P101 sheet having a thickness of 1 mm and a HDPE sheet having a thickness of 1 mm were bonded to each other by the hot-pressing machine (at 100° C.) for 2 minutes to manufacture a laminated body 102 having a thickness of 2 mm.

<Evaluation of Laminated Body>

1. Peeling Test

An HDPE sheet side of each of the laminated bodies 1, 2, 101, and 102 was fixed to a base, and a stress necessary for peeling the P1 sheet or the P101 sheet from the HDPE sheet was measured. The stress required for peeling the laminated body 1 was indexed as 100 and shown in Table 2.

TABLE 2

|  | Examples | | Comparative Examples | |
| --- | --- | --- | --- | --- |
|  | Laminated body 1 | Laminated body 2 | Laminated body 101 | Laminated body 102 |
| Peeling Test (Index) | 100 | 50 | 40 | 10 |

As seen from Table 2, in the laminated bodies 1 and 2 of Examples, the stress required for peeling a copolymer layer from an olefin-based resin layer was larger than that in the laminated bodies 101 and 102 of Comparative Examples. Therefore, it can be understood that, as compared with the laminated body of Comparative Examples, the laminated body of Examples has a larger adhesion strength between the olefin-based resin layer and the copolymer layer and is hardly broken.

2. Mechanical Strength

Mechanical strengths of the laminated body 1 and a single-layered body were evaluated from a viewpoint of a tensile strength at break (Tb) and elongation at break (Eb).

The single-layered body is the P1 sheet having a thickness of 1 mm obtained by hot-pressing the copolymer (P1) at 145° C.

The laminated body 1 and the single-layered body were molded into a dumbbell-shaped No. 3 shape based on JIS K 6251 (2017) to obtain a test piece.

Based on JIS K 6251 (2017), the tensile strength at break (Tb) was measured using a tensile tester (manufactured by Instron Corporation) as a maximum tensile force required for 100% elongating the test piece at 25° C. and breaking the test piece.

The elongation at break (Eb) was determined as a length relative to a length before the pulling (100%) by pulling the test piece at 25° C. at a rate of 100 mm/min and measuring a length when a molded body was broken.

Results are shown in Table 3.

3. Low-Temperature Impact Test

The single-layered body used in a mechanical strength evaluation and the laminated body 1 were cut into a size of 100 mm×100 mm in length and width to obtain a test piece. After cooling the test piece with liquid nitrogen, the test piece was allowed to stand on a cork plate, and after 5 seconds, an iron ball having a weight of 500 g was dropped onto the test piece from a height of 30 cm.

Results are shown in Table 3.

TABLE 3

|  |  | Examples Laminated body 1 | Comparative Examples Single-layered body |
| --- | --- | --- | --- |
| Tensile strength at break | MPa | 16 | 39 |
| Elongation at break | % | 800 | 550 |
| Low-temperature impact test | — | Not Broken | Not Broken |

It was found that the laminated body 1 is obtained by laminating a sheet made of the olefin-based resin (HDPE) on a material the same as that of the single-layered body, and tensile elongation was greatly improved by the lamination. The reason for this is not clear, but it is considered that the lamination has some positive influence on the elongation.

Further, in the low-temperature impact test, neither the laminated body 1 of the Example nor the single-layered body of the Comparative Example was broken.

4. Repair Test

A sheet made of P1 having a thickness of 0.5 mm was laminated on the laminated body 1 and pressed at 100° C. for 30 seconds to manufacture a laminated body 3 having a three-layer structure in which a layer structure is P1/P1/HDPE. A sheet made of P1 having a thickness of 0.5 mm was laminated on the laminated body 101 and pressed at 100° C. for 30 seconds to manufacture a laminated body 103 having a three-layer structure in which a layer structure is P1/P101/HDPE. HDPE sheet sides of the laminated body 3 and the laminated body 103 were fixed to the base, and a stress necessary for peeling the P1 sheet on a surface layer from the HDPE sheet was measured. A stress required for peeling the laminated body 1 in "1. Peeling Test" was indexed as 100. An index of the laminated body 3 is 100, and an index of the laminated body 103 is 40.

From this, it is clear that the laminated body of the examples can be repaired in a short time, and an adhesion strength after the repair is also high.

REFERENCE SIGNS LIST

10 laminated body

12 layer (C)

14 layer (R)

The invention claimed is:

1. A laminated body comprising:
   a layer (C) consisting of a composition (c) containing a copolymer that contains a conjugated diene unit and a non-conjugated olefin unit and contains 0 mol % of a butylene unit; and
   a layer (R) consisting of a composition (r) containing an olefin-based resin,
   wherein the layer (C) is adjacent to the layer (R), the copolymer further contains an aromatic vinyl unit, a layer thickness of the laminated body is 0.2 to 20 mm, a thickness ratio of the layer (C) to the layer (R) [the total layer thickness of the layer (C)/the total layer thickness of the layer (R)] is 1/9 to 9/1, and the olefin-based resin is polyethylene-based resin or polypropylene-based resin.

2. The laminated body according to claim 1, wherein a difference between the number of carbon atoms in the non-conjugated olefin unit contained in the copolymer and the number of carbon atoms in the ethylene or propylene unit contained in the olefin-based resin is 2 or less.

3. The laminated body according to claim 1, wherein in the copolymer, a content of the conjugated diene unit is more than 0 mol % and 50 mol % or less, and a content of the non-conjugated olefin unit is 50 mol % or more and less than 100 mol %.

4. The laminated body according to claim 1, wherein in the copolymer, a content of the conjugated diene unit is 1 to 50 mol %, a content of the non-conjugated olefin unit is 40 to 97 mol %, and a content of the aromatic vinyl unit is 2 to 35 mol %.

5. The laminated body according to claim 1, wherein in the copolymer, a melting point measured by a differential scanning calorimeter is 30 to 130° C.

6. The laminated body according to claim 1, wherein a degree of crystallinity of the copolymer is 0.5 to 50%.

7. The laminated body according to claim 1, wherein a weight-average molecular weight of the copolymer as expressed in terms of polystyrene is 10,000 to 9,000,000.

8. The laminated body according to claim 1, wherein in the copolymer, the non-conjugated olefin unit is an acyclic non-conjugated olefin unit.

9. The laminated body according to claim 8, wherein in the copolymer, the acyclic non-conjugated olefin unit is consisting of only an ethylene unit.

10. The laminated body according to claim 1, wherein in the copolymer, the aromatic vinyl unit contains a styrene unit.

11. The laminated body according to claim 1, wherein in the copolymer, the conjugated diene unit contains at least one selected from a group consisting of a 1,3-butadiene unit and an isoprene unit.

12. The laminated body according to claim 1, wherein in the copolymer, a main chain only has an acyclic structure.

13. A product using the laminated body according to claim 1.

* * * * *